Patented Mar. 13, 1934

1,951,123

UNITED STATES PATENT OFFICE 1,951,123

PROCESS FOR THE PREPARATION OF BUTYLCYMENE

Henri Barbier, Geneva, Switzerland

No Drawing. Application May 29, 1930, Serial No. 457,497. In Germany April 12, 1930

6 Claims. (Cl. 260—168)

This invention relates to a process of preparing tertiary butylcymene.

Its chief object is to provide a hydrocarbon derivative of toluene, which derivative will contain simultaneously the isopropyl and the tertiary butyl groups and a process for making same and its isomers. The tertiary butylcymene, and more particularly the tertiary butyl paracymene, a hitherto non-existent substance, can be easily transformed into a dinitro derivative. This dinitro derivative has a musk-like odour of a certain novel nuance which makes it especially suitable for use in the manufacture of perfumes.

When any of the known processes for introducing into paracymene the tertiary butyl group are employed on the scale etc. required for commercial perfume-making, many difficulties which are insurmountable obstacles to the commercial preparation of the tertiary butylcymene are encountered. The treatment of cymene with isobutyl chloride or tertiary butylchloride in the presence of aluminium chloride, for example, gives yields of butylcymene, which, because cymene is decomposed by aluminium chloride, are so small proportionally to the quantities of material necessary that this method has never been practical commercially. The treatment of cymene with isobutylalcohol and sulphuric acid, according to any method except the present one, results in the total sulphonation of the hydrocarbon, which, when sulphonized, cannot well be nitrated. Even if, by the use of a low temperature, the sulphonation is prevented from occurring, the isobutyl group does not at all enter the cymene from isobutylic alcohol.

I have discovered that the tertiary butyl group can be introduced into cymene, partially paracymene, by using tertiary butylalcohol preferably to isobutylalcohol, and, in order to prevent the sulphonation of the hydrocarbon, by effecting condensation in the presence of a condensing agent, preferably sulphuric acid, and at a certain low temperature.

Example.—60 kg. concentrated sulphuric acid are cooled so as to be at a temperature not above 0° C. and stirred into 10 kg. paracymene. 5 kg. tertiary butylalcohol are poured into the mixture while preventing the temperature of the mixture from rising above 0° C. The mixture is then poured into ice water. The upper oily layer is then separated off and is neutralized with a solution of caustic soda. The so-treated oily layer is then fractionated. A certain amount of paracymene is recovered and is used for a repetition of the preceding operations. The fraction coming over between 220 and 230° C. forms the tertiary butyl paracymene. The total yield is 90% of the weight of the cymene employed.

This new compound gives, by nitration with fuming nitric acid, or with sulphonitric mixture, a dinitro-derivative which has a musk-like odour of a novel nuance. With nitric acid of 70%, the said compound gives the mononitro-derivative, which has no odour.

The preparation of this dinitro-derivative forms the subject of the co-pending application Serial No. 457,498.

I claim:

1. The process of preparing, from a cymene by use of a sulphuric-condensing agent, a tertiary-butyl cymene without sulphonating to any discernible extent, comprising reacting the cymene and tertiary butyl alcohol with a sulphuric acid condensing agent while preventing the temperature of the reaction zone from rising above 0° C.; adding an aqueous separator to form an oily layer including the tertiary-butyl cymene, separating said layer from the rest of the reagents, fractionating said layer and collecting the fraction thereof coming over at 220–230° C., whereby is produced tertiary-butyl cymene in the proportion of 90% thereof by weight of the cymene, said layer being such as to be nitratable 100% to produce dinitro-tertiary-butyl cymene.

2. The process of preparing, from a cymene by use of a sulphuric-condensing agent, a tertiary-para-butyl cymene without sulphonating to any discernible extent, comprising reacting the para-cymene and tertiary butyl alcohol with the sulphuric acid condensing agent while preventing the temperature of the reaction zone from rising above 0° C.; adding an aqueous separator to form an oily layer including the tertiary-para-butyl cymene, separating said layer from the rest of the reagents, fractionating said layer and collecting the fraction thereof coming over at 220–230° C., fractionating said fraction, and collecting the colorless liquid coming over at or about 225° C., whereby is produced tertiary-para-butyl cymene in the proportion of 90% thereof by weight of the cymene, said layer being such as to be nitratable 100% to produce dinitro-tertiary-para-butyl cymene.

3. The process of preparing, from a cymene by use of a sulphuric-condensing agent, a tertiary-meta-butyl cymene without sulphonating to any discernible extent, comprising reacting the meta-cymene and tertiary butyl alcohol with the sulphuric acid condensing agent while preventing the temperature of the reaction zone from rising above 0° C.; adding an aqueous separator to form an oily layer including the tertiary-meta-butyl cymene, separating said layer from the rest of the reagents, fractionating said layer and collecting the fraction thereof coming over at 220-230° C., fractionating said fraction, and collecting the colorless liquid coming over at or about 225° C., whereby is produced tertiary-meta-butyl cymene in the proportion of 90% thereof by weight of the cymene, said layer being such as to be nitratable 100% to produce dinitro-tertiary-meta-butyl cymene.

4. A tertiary-butyl-cymene.
5. A tertiary-butyl-para-cymene.
6. A tertiary-butyl-meta-cymene.

HENRI BARBIER.